United States Patent
Page

(10) Patent No.: US 6,922,519 B2
(45) Date of Patent: Jul. 26, 2005

(54) METHODS AND SYSTEMS FOR MARRING FIBER OPTIC SUBSTRATES

(75) Inventor: David J. Page, Painesville, OH (US)

(73) Assignee: Lumitex, Inc., Strongsville, OH (US)

( * ) Notice: Subject to any disclaimer, the term of this patent is extended or adjusted under 35 U.S.C. 154(b) by 145 days.

(21) Appl. No.: 10/465,134

(22) Filed: Jun. 19, 2003

(65) Prior Publication Data

US 2004/0258387 A1 Dec. 23, 2004

(51) Int. Cl.$^7$ ................................................ G02B 6/00
(52) U.S. Cl. ....................... 385/147; 385/901; 425/363
(58) Field of Search ................................ 385/147, 901; 264/1.24, 1.5; 451/5, 41, 56; 425/363

(56) References Cited

U.S. PATENT DOCUMENTS

| | | | |
|---|---|---|---|
| 4,234,907 A | 11/1980 | Daniel | |
| 5,312,569 A | 5/1994 | Mezei | .................. 264/1.24 |
| 5,312,570 A | 5/1994 | Halter | ..................... 264/1.5 |
| 5,499,912 A | * 3/1996 | Mezei | ..................... 425/363 |

OTHER PUBLICATIONS

Patent Abstracts of Japan, vol. 0140, No. 40 (P–995), Jan. 25, 1990 & JP 01 273007 A (Mitsubishi Rayon Co. Ltd.), Oct. 31, 1989 *abstract* (enclosed).

* cited by examiner

Primary Examiner—Phan T. H. Palmer
(74) Attorney, Agent, or Firm—Renner, Otto, Boisselle & Sklar, LLP

(57) ABSTRACT

Methods and systems for marring the surface of a fiber optic substrate by pressing a length of the substrate against an elongate support with at least one roller and causing relative lengthwise movement between the roller and support with the roller pressing the substrate against the support and the roller rolling along the substrate. One of the roller and support may have an abrasive surface for marring the substrate during such relative lengthwise movement between the roller and support. Alternatively, the abrasive surface may be on a sheet supported by the support.

29 Claims, 2 Drawing Sheets

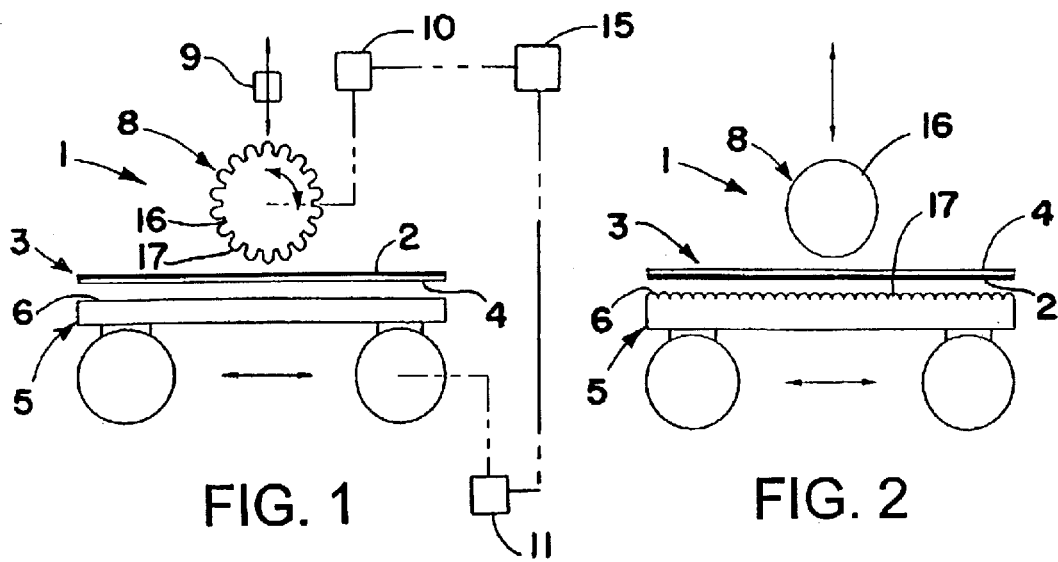
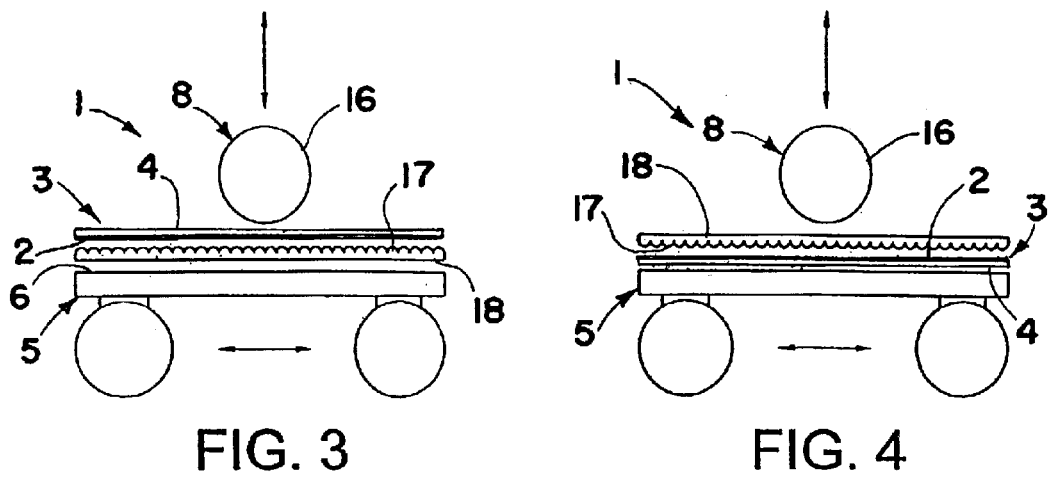
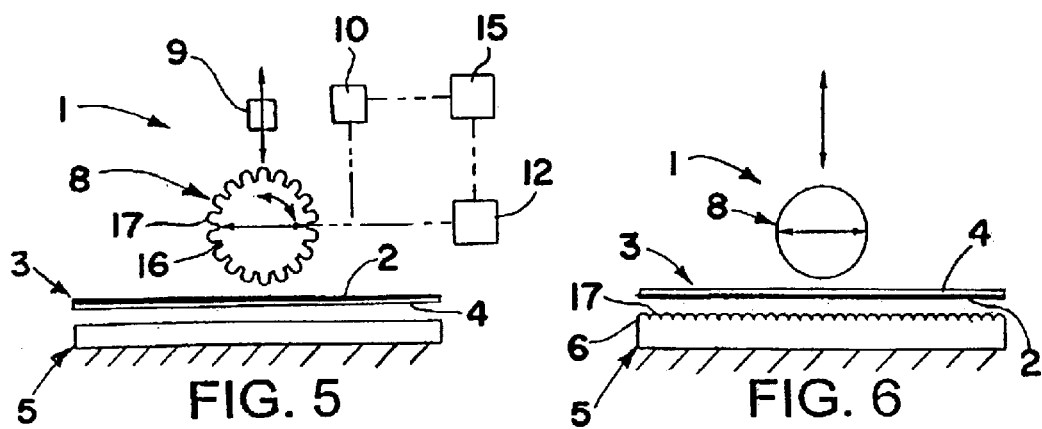

METHODS AND SYSTEMS FOR MARRING FIBER OPTIC SUBSTRATES

FIELD OF THE INVENTION

This invention relates to various methods and systems for marring the surface of fiber optic substrates to create fiber optic illuminating devices.

BACKGROUND OF THE INVENTION

Fiber optic substrates can be made into illuminating devices by marring or abrading (hereinafter collectively referred to as "marring") the surface of the optical fibers at various points along their length to cause a portion of the light applied to one or both ends of the optical fibers to be emitted from the marred surface areas. Such illuminators may be used for example for display lighting, back lighting, front lighting and/or ornamental lighting and the like.

Increased surface marring results in increased light emission. Accordingly, the intensity of the light emitted along the length of the substrates can be varied by varying the density or aggressiveness of the surface marring.

It is generally known to mar fiber optic substrates by stamping, machining, molding, sandblasting or rolling fiber optic substrates to create a desired illumination pattern on the surface of the substrates. However, there is a continuing need for other effective methods and systems for marring fiber optic substrates to create fiber optic illuminators having a desired illumination pattern.

SUMMARY OF THE INVENTION

The present invention relates to various methods and systems for marring fiber optic substrates to create relatively inexpensive illuminators having a desired illumination pattern.

In accordance with one aspect of the invention, the system includes at least one roller for pressing a length of fiber optic substrate against an elongate support while causing relative movement between the roller and support lengthwise of the support with the roller rolling along the substrate. At least one of the roller and the support supports or has an abrasive surface thereon for marring the substrate during such relative lengthwise movement between the roller and support with the roller in pressing and rolling engagement with the substrate.

In accordance with another aspect of the invention, the pressure between the roller and support may be varied during such relative lengthwise movement to vary the marring of the substrate.

In accordance with another aspect of the invention, the rate of relative lengthwise movement between the roller and support may be varied with variations in pressure between the roller and support to vary the marring of the substrate.

In accordance with another aspect of the invention, a non-uniform or variable abrasive surface may be provided on the roller. Also, the roller may be indexed to a predetermined rotational orientation and the roller and support positioned in a predetermined relative lengthwise starting position prior to causing the roller to press the substrate against the support and moving the roller and support lengthwise relative to one another to obtain an easily repeatable marring pattern on the substrate.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a schematic illustration of one system embodiment of the invention including at least one roller having an abrasive surface that is movable toward and away from a support for releasably pressing a length of fiber optic substrate against the support and the support is movable lengthwise relative to the roller with the abrasive surface of the roller rotatably pressing against the substrate to mar the substrate during such relative lengthwise movement.

FIG. 2 is a schematic illustration of another system embodiment of the invention which is substantially the same as that shown in FIG. 1 except that the abrasive surface is on the support.

FIGS. 3 and 4 are schematic illustrations of other system embodiments of the invention which are substantially the same as that shown in FIG. 1 except that the abrasive surface is on a sheet that is interposed between the substrate and the support in FIG. 3 and between the roller and the substrate in FIG. 4.

FIG. 5 is a schematic illustration of another system embodiment of the invention which is substantially the same as that shown in FIG. 1 except that the support is fixed and the roller is movable lengthwise relative to the support.

FIG. 6 is a schematic illustration of another system embodiment of the invention which is substantially the same as that shown in FIG. 5 except that the abrasive surface is on the support similar to FIG. 2.

DETAILED DESCRIPTION OF THE INVENTION

Figure 7:
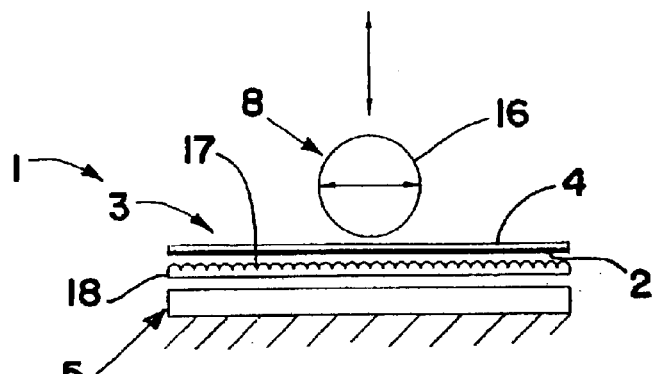
FIG. 7 is a schematic illustration of another system embodiment of the invention that is substantially the same as that shown in FIG. 5 except that the abrasive surface is on a sheet that is interposed between the substrate and support similar to FIG. 3.

Referring now in detail to the drawings and initially to FIG. 1, there is schematically shown a system 1 in accordance with the invention for marring the surface of optical fibers 2 of a fiber optic substrate 3 for causing light applied to one or both ends of the optical fibers to be emitted from the marred surface areas thereof. The substrate 3 may be comprised of a plurality of such optic fibers 2, only one of which is shown, adhered to a suitable backing 4 which may for example be a plastic, generally reflective, sheet. The surfaces of other light guides including fiber optic rods and transparent plastic films, sheets or plates may also be marred in accordance with the invention similar to fiber optic substrates to create illuminators having a desired illumination pattern.

System 1 includes an elongate support 5 having a generally flat support surface 6 for supporting a length of the fiber optic substrate 3 thereon. One or more rollers 8 supported for example by an actuator 9 or other suitable mechanism is movable toward and away from the support 5 for releasably pressing the substrate against the support surface during relative lengthwise movement between the support 5 and roller 8 to mar a surface of the substrate as described hereafter.

Figure 8:
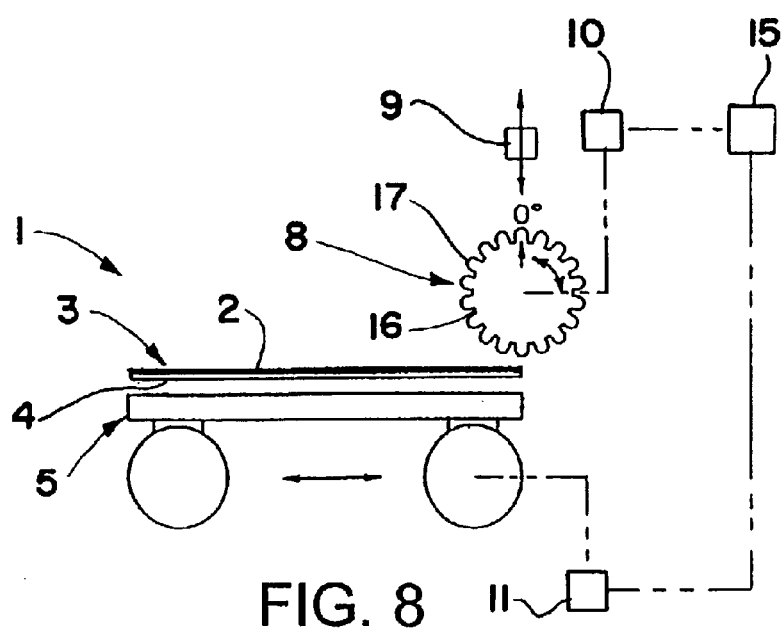
FIGS. 8 and 9 are schematic illustrations of another system embodiment of the invention that is substantially the same as that shown in FIG. 1 except that a non-uniform or variable abrasive surface is on the roller and the roller may be indexed to a predetermined rotational orientation and the roller and support positioned in a predetermined relative lengthwise starting position as shown in FIG. 8 prior to causing the roller to press the substrate against the support and moving the roller and support lengthwise relative to one another as shown in FIG. 9 to obtain an easily repeatable marring pattern on the substrate.

In the embodiments shown in FIGS. 1–4, 8 and 9 the support 5 is mounted for lengthwise movement relative to the roller 8, whereas in the embodiments shown in FIGS. 5–7, the support 5 is fixed and the roller 8 is mounted for lengthwise movement relative to the support as well as for movement toward and away from the support. In any case, the roller 8 may be rotated as by means of a suitable drive motor 10 to cause the roller to roll along the substrate 3 at the same rate of relative lengthwise movement between the roller and support so there is no relative rotational movement between the roller and substrate during marring of the substrate. To that end, the drive motor 10 for rotating the roller 8 and the various drive mechanisms 11 or 12 for causing lengthwise movement of the support relative to the roller as schematically shown in FIGS. 1 and 8 or for causing lengthwise movement of the roller relative to the support as schematically shown in FIG. 5 may all be commonly controlled by a programmable computer/controller 15 or the like. Similar type drive mechanisms and controls may of course also be included in the systems shown in the various other drawing figures.

Figure 9:
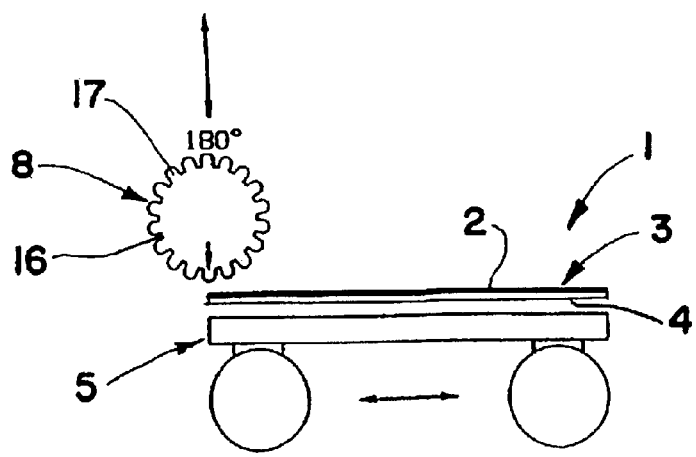

The surface 16 of roller 8 may be roughened or serrated or covered with a diamond coating or grit sandpaper or other suitable abrasive material to provide an abrasive surface 17 thereon for marring the substrate 3 during relative lengthwise movement between the roller and support with the roller pressing the substrate against the support as the roller rolls along the substrate as schematically shown in FIGS. 1, 5 and 9. Alternatively, the abrasive surface 17 may be on the support surface 6 as schematically shown in FIGS. 2 and 6 or on an abrasive sheet 18 that may be interposed between the substrate and the support as shown in FIGS. 3 and 7 or between the roller and the substrate as shown in FIG. 4 to mar the substrate during such relative lengthwise movement. When the roller surface or support surface is not the abrasive surface, these surfaces may be hard or have a deformable cover. Regardless of where the abrasive surface 17 is, the surface of the fiber optic substrate to be marred thereby must be exposed to the abrasive surface 17 during the marring operation. Otherwise, the systems shown in the different drawing figures are substantially the same and accordingly the same reference numbers are used to designate like parts.

If the substrate 3 is marred uniformly, the amount of light emitted along its length will be greater near where the light enters the substrate and less further away from where the light enters the substrate. Therefore, if uniform lighting is desired, there is a need to mar the substrate unevenly (i.e., more aggressively away from where the light enters and less aggressively near where the light enters the substrate). In order to produce a specific illumination pattern, the pressure between the roller and the support surface may be varied by the computer/controller 15 during such relative lengthwise movement between the roller and support surface. Likewise, the rate of relative lengthwise movement between the roller and support surface may be varied by the computer/controller 15 along with the pressure to produce a specific illumination pattern. Also, the roller 8 and support 5 may be moved back and forth lengthwise relative to one another with the roller pressing the substrate against the support surface 6 as many times as desired to more aggressively mar the substrate to produce a specific illumination pattern. Further, the abrasive surface 17 may have a variable pattern to produce a variable illumination pattern on the substrate.

If a non-uniform or variable abrasive surface 17 is provided on the roller 8, the roller may be indexed to a predetermined rotational orientation and the roller and support located in a predetermined lengthwise starting position relative to one another before the roller is moved toward the support to press the substrate against the support surface as schematically shown in FIG. 8. This has the benefit that when the roller and support are moved lengthwise relative to each other as schematically shown in FIG. 9 with the roller pressing the substrate against the support surface, a desired illumination pattern may be obtained that may easily be repeatedly formed on any number of substrates as desired.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the invention. Also, all of the disclosed functions may be computerized and/or automated as desired. In addition, while a particular feature of the invention may have been disclosed with respect to only one of several embodiments, such feature may be combined with one or more other features of the other embodiments as may be desired and advantageous for any given or particular application.

What is claimed is:

1. A method for marring a fiber optic substrate comprising the steps of supporting a length of the substrate on an elongate support, and causing relative movement between at least one roller and the support lengthwise of the support with the roller pressing the substrate against the support and the roller rolling along the substrate, wherein at least one of the roller and the support supports or has an abrasive surface thereon for marring the substrate during such relative lengthwise movement between the roller and the support with the roller in rolling engagement with the substrate.

2. The method of claim 1 wherein the abrasive surface is on a sheet supported by the support.

3. The method of claim 2 wherein the sheet is interposed between the roller and the substrate.

4. The method of claim 3 wherein the abrasive surface on the roller is uniform.

5. The method of claim 2 wherein the sheet is interposed between the support and the substrate.

6. The method of claim 1 wherein the abrasive surface is on the roller.

7. The method of claim 6 wherein the abrasive surface on the roller has a non-uniform or variable pattern.

8. The method of claim 7 wherein the roller is indexed to a predetermined rotational orientation and the roller and support are positioned in a predetermined relative lengthwise starting position prior to causing the roller to press the substrate against the support and moving the roller and the support lengthwise relative to one another with the roller pressing the substrate against the support to obtain a repeatable marring pattern on the substrate.

9. The method of claim 1 further comprising the step of moving the roller toward the support to press the substrate against the support prior to causing such relative lengthwise movement between the roller and the support.

10. The method claim 9 further comprising the step of moving the roller away from the support to release the substrate from the support after the substrate has been marred to the desired extent.

11. The method of claim 1 wherein the roller and the support are moved back and forth lengthwise relative to one another with the roller pressing the substrate against the support to repeatedly mar the substrate.

12. The method of claim 1 wherein the pressure between the roller and the support is varied during such relative lengthwise movement between the roller and the support to obtain a desired marring pattern on the substrate.

13. The method of claim 1 wherein the rate of relative lengthwise movement between the roller and the support is varied while the pressure between the roller and the support is varied to obtain a desired marring pattern on the substrate.

14. The method of claim 1 wherein the support is fixed and the roller is movable lengthwise relative to the support.

15. The method of claim 1 wherein the support is movable lengthwise relative to the roller.

16. The method of claim 1 wherein the abrasive surface is on the support.

17. The method of claim 1 wherein the support is fixed and the roller is rotatably driven to cause the roller to move lengthwise relative to the support with the roller pressing the substrate against the support.

18. A system for marring a fiber optic substrate comprising an elongate support for supporting a length of the fiber optic substrate, at least one roller for pressing the substrate against the support, the roller and the support being relatively movable lengthwise of the support, and the roller being rotatable along the substrate during such relative lengthwise movement, at least one of the roller and the support supporting or having an abrasive surface for marring the substrate during such relative lengthwise movement between the roller and the support with the roller in rolling engagement with the substrate.

19. The system of claim 18 further comprising means for varying the pressure between the roller and the support during such relative lengthwise movement between the roller and the support to obtain a desired marring pattern on the substrate.

20. The system of claim 19 further comprising means for varying the rate of relative lengthwise movement between the roller and the support while the pressure between the roller and the support is varied to obtain a desired marring pattern on the substrate.

21. The system of claim 20 wherein the abrasive surface on the roller has a variable or non-uniform pattern, further comprising means for indexing the roller to a predetermined rotational orientation, means for locating the roller and the support in a predetermined relative lengthwise starting position prior to causing the roller to press the substrate against the support and moving the roller and the support lengthwise relative to one another with the roller pressing the substrate against the support to obtain a repeatable marring pattern on the substrate.

22. The system of claim 18 further comprising means for moving the roller toward and away from the support to releasably press the substrate against the support.

23. The system of claim 18 wherein the abrasive surface is on the roller.

24. The system of claim 18 further comprising means for moving the roller and the support back and forth lengthwise relative to one another with the roller pressing the substrate against the support to repeatedly mar the substrate.

25. The system of claim 18 further comprising means for moving the support lengthwise relative to the roller.

26. The system of claim 18 wherein the support is fixed, further comprising means for moving the roller lengthwise relative to the support, and means for causing the roller to roll along the substrate at the same rate of relative lengthwise movement between the roller and the support.

27. The system of claim 18 wherein the abrasive surface is on the support.

28. The system of claim 18 wherein the abrasive surface is on a sheet supported by the support.

29. A method for marring a light guide comprising the steps of supporting a length of the light guide on an elongate support, and causing relative movement between at least one roller and the support lengthwise of the support with the roller pressing the light guide against the support and the roller rolling along the light guide, wherein at least one of the roller and the support supports or has an abrasive surface thereon for marring the light guide during such relative lengthwise movement between the roller and the support with the roller in rolling engagement with the light guide.

* * * * *